Feb. 9, 1960 E. P. HAEN 2,924,197
FEED DISPENSING SILO
Filed Dec. 27, 1956 2 Sheets-Sheet 1
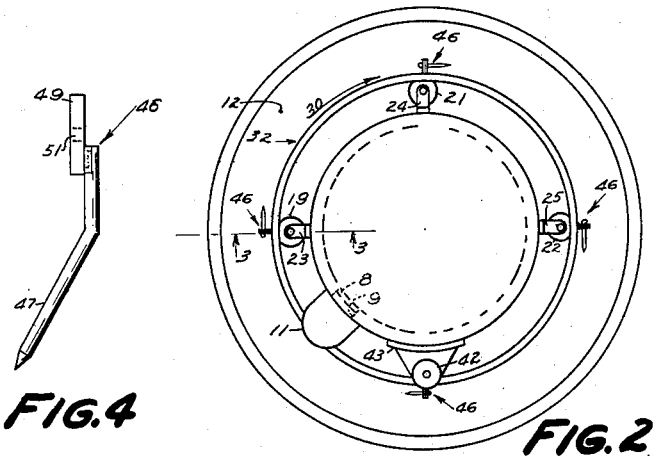
FIG.4 FIG.2 FIG.1
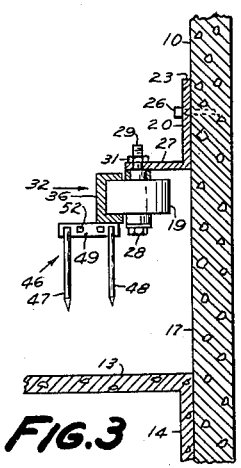
FIG.3
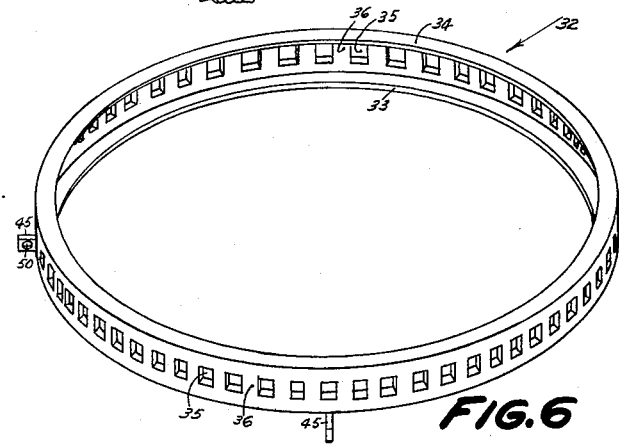
FIG.6
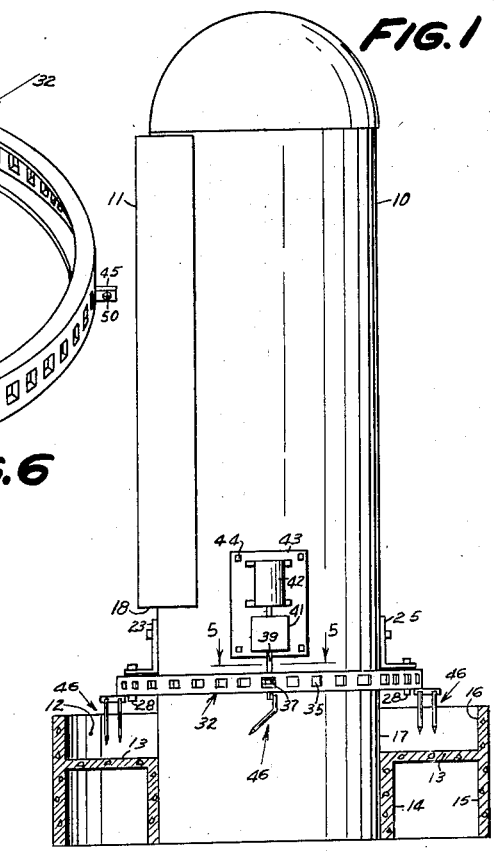
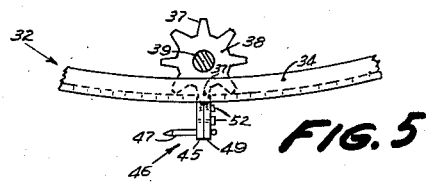
FIG.5
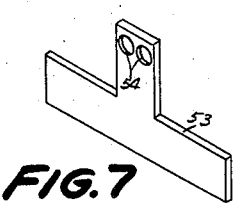
FIG.7
INVENTOR.
EUGENE P. HAEN
BY *SC Rinish*
ATTORNEY Feb. 9, 1960

E. P. HAEN 2,924,197

FEED DISPENSING SILO

Filed Dec. 27, 1956

INVENTOR.
EUGENE P. HAEN
BY
ATTORNEY

United States Patent Office 2,924,197
Patented Feb. 9, 1960

2,924,197

FEED DISPENSING SILO

Eugene P. Haen, Holland, Wis.

Application December 27, 1956, Serial No. 630,916

6 Claims. (Cl. 119—52)

This invention relates generally to a silo, and more particularly to feed receiving and distributing means in combination with a silo.

A purpose of this invention is to provide a novel, simple, inexpensive and efficient feed dispensing silo.

An object of this invention is the provision of a feed dispensing silo incorporating novel ring gear means.

Another object is to provide a feed dispensing silo incorporating novel ring gear, guide means.

Still another object of this invention is the provision of a feed dispensing silo incorporating a fork distributing means.

Yet another object is the provision of a feed dispensing silo having an eccentrically related feed trough for unlimited herd capacity.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 is an elevation view, partly in section, of the invention;

Fig. 2 is a full plan view of the apparatus shown in Fig. 1;

Fig. 3 is an enlarged fragmentary section view taken along line 3—3 of Fig. 2;

Fig. 4 is an enlarged elevation view illustrating a distributing fork;

Fig. 5 is an enlarged fragmentary plan view taken along line 5—5 of Fig. 2;

Fig. 6 is an enlarged isometric view illustrating a ring gear element, per se;

Fig. 7 is a perspective view of a shovel or paddle type distributing means that can be used in lieu of the fork means of Fig. 4;

Figure 9:
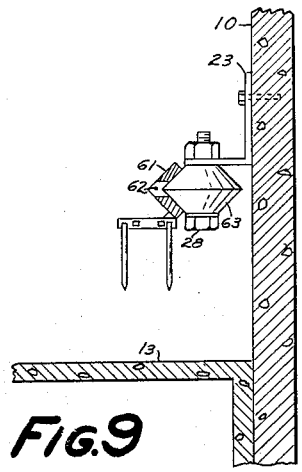
Fig. 9 is a fractional section, elevation view of a modified ring gear construction, showing an angle section, ring gear supported on and guided by a double-cone roller.

Referring now to the drawings, wherein like reference characters designate like or corresponding parts throughout the several views, there is shown a conventional ensilage silo 10 having a vertical chute 11 built over the usual longitudinal silo slot 9 having removable panels 8 thereacross. The chute originates at the top of the silo, and extends downwardly to guide ensilage into an annular feed trough 12 that surrounds the silo.

The feed trough comprises a horizontal annular deck 13 surrounding the silo with its inner edge periphery disposed against the outer periphery of the silo.

Said deck is supported by a pair of concentric cylindrical supports or legs 14 and 15, respectively, leg 14 being disposed against the silo, and leg 15 being uniformly spaced from the silo and disposed adjacent the outer edge of said annular deck.

A cylindrical side wall 16, spaced from the silo and mounted on deck 13, forms the outer wall of trough 12. The deck 13 forms the bottom of the trough; and the adjacent silo wall portion 17 serves as the remaining or inner wall of the annular trough.

Said feed trough is of a height suitable for cattle to feed therefrom.

The discharge opening 18 of the chute 11 is disposed above the feed trough 12 thereby adapting the chute to discharge directly into feed trough 12.

A plurality of circumferentially spaced and equivalently radially extending rollers 19, 21 and 22, are mounted on the outer periphery of the silo, intermediate the chute discharge end 18 and the bottom 13 of the feed trough, on a plane substantially parallel to the plane of the horizontal deck 13. Said rollers are mounted axially vertically on right angle brackets 23, 24 and 25, respectively. The vertically disposed legs of the brackets, such as leg 20, see Fig. 3, are secured to the periphery of the silo by means of screws 26, or the like.

The horizontally projecting leg 27 thereof is apertured to receive the threaded end portion of trunion bolts such as indicated at 28. The threaded end portion 27, of said bolt is of a reduced diameter, thereby forming an annular shoulder at its juncture with the main body of the bolt, which shoulder is juxtaposed with the lower margins of said aperture and is drawn tightly thereagainst by means of nut 31.

The rollers, such as 19, are interposed around the main body of said bolt between said annular shoulder and the head of said bolt, and are adapted to rotate therearound.

All of the other rollers are similarly mounted and journalled.

Said ring gear consists of a channel section beam formed into a ring, the flanges 33 and 34 thereof projecting inwardly.

The rollers, such as 19, see Fig. 3, are received between said flanges and thereby support and guide said ring gear revolvable around the silo.

The ring gear is provided with uniformly spaced apertures, such as at 35, in its web 36, to receive the teeth 37 of a vertically axially disposed driving sprocket 38, see Fig. 5. Said sprocket is mounted rotatively-rigid on shaft 39 which is journalled in reduction gear box 41 which in turn is driven by motor 42. Said motor and gear box are mounted on a plate 43 secured to the silo as by bolts 44.

A plurality of quadrature spaced, radially projecting bars, such as indicated at 45, Figs. 5 and 6, are welded to the underside of the ring gear 32 to provide mounting means for distributing forks generally indicated at 46. Said bars are provided with a pair of spaced threaded apertures 50 to threadedly receive mounting bolts therein.

The distributing forks comprise a pair of spaced tines 47 and 48 welded to a cross bar 49. Said cross bars are provided with apertures 51, to receive bolts therethrough, in registry with apertures 50.

Bolts, such as indicated at 52, are passed through the cross bar apertures 50 and threadedly engage with the apertures in said mounting bars 45, thereby removably mounting said distributing fork on said ring gear.

The tines are of a length to suitably distribute feed in trough.

The above fork type distributing means is preferred when grass feed is to be distributed. However, for the distribution of corn ensilage, or the like, a shovel or paddle type of distributing means is provided, such as shown in Fig. 7. Paddle 53, thereof, is provided with a pair of apertures 54 to receive bolts therein for mounting on mounting bar 45, in lieu of forks 46, when desired.

*Operation.*—When the motor 42 is started, it rotatably drives the sprocket 38 through the reduction gearing 41. Said sprocket, engaged in apertures 35, revolvably drives the ring gear 32 around the silo and in the trough 12, as indicated by arrow 30.

Ensilage feed removed from the silo, either manually or mechanically, is pitched into chute 11 and directed downwardly therein to discharge into trough 12. As the feed accumulates in the trough under the discharge end 18 of the chute, it is distributed around the trough by the slowly revolving distributing means, such as fork 46 or paddle 53.

Figure 8:
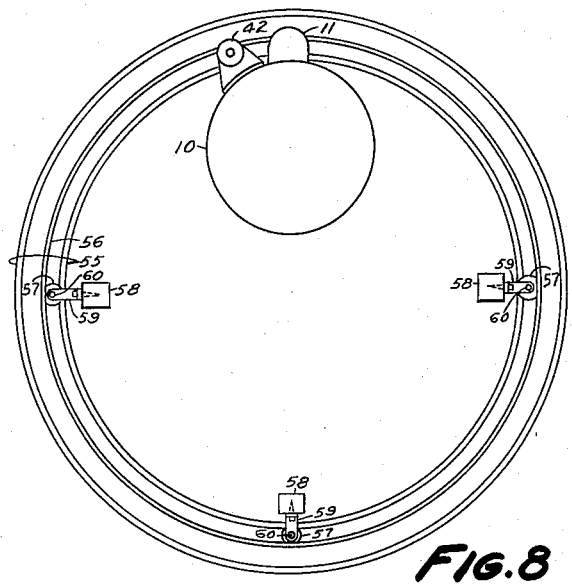
Fig. 8 is a plan view of a modified construction, showing the feed trough means eccentrically related to the silo.

Fig. 8 is a plan view of a modified feed trough and ring gear construction, showing a feed trough 55 and associated apertured, channel section, ring gear 56 eccentrically related to the silo 10 whose chute 11 discharges into said trough 55. Ring gear 56 is similar to ring gear 32. Motor 42 mounted on the silo, drives the apertured ring gear through means of the sprocket 38 not shown in this figure. The ring gear is supported on and guided by spaced rollers, such as indicated at 57, mounted on posts 58 through means of trunnion-bolts such as indicated at 60, and brackets such as indicated at 59.

Fig. 9 is a fractional section elevation view, likened to Fig. 3, of a modified ring gear construction, showing an equal-legs angle section ring gear 61, apertured as at 62, supported on and guided by spaced double-cone rollers, such as indicated at 63, mounted on silo 10 through means of trunnion-bolts 28 and brackets such as indicated at 23. Uniformly spaced apertures 62 receive sprocket teeth such as indicated on sprocket 38, Fig. 5. It is to be noted that the angle section is disposed so that the principal axis about which the radius of gyration is least is disposed vertical.

Figure 10:
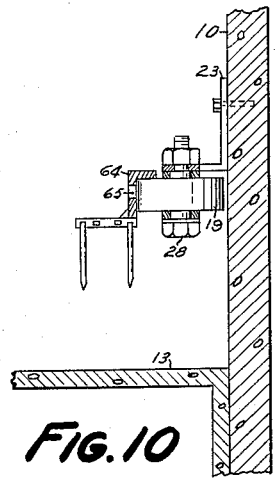
Fig. 10 is a fractional section, elevation view of a modified ring gear construction, showing an unequal-leg's angle section, ring gear supported on and guided by a roller.

Fig. 10 is a fractional section elevation view, likened to Fig. 3, of a modified ring gear construction, showing an unequal-legs angle section ring gear 64, apertured as at 65, supported on and guided by rollers, such as indicated at 19, mounted on silo 10 through means of trunnion-bolts 28 and brackets such as indicated at 23. Uniformly spaced apertures 65 are adapted to receive sprocket teeth such as indicated on sprocket 38, Fig. 5.

Figure 11:
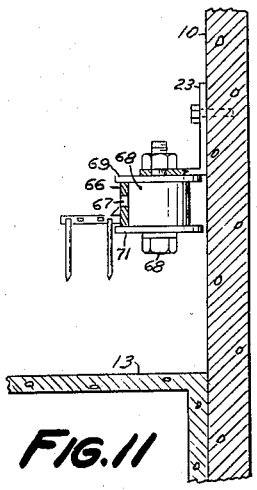
Fig. 11 is a fractional section, elevation view of a modified ring gear construction, showing a band type apertured ring gear supported on and guided by a flanged roller.

Fig. 11 is a fractional section elevation view, likened to Fig. 3, of a modified ring gear construction, showing a band, rim or web type ring gear, flexible or stiff, apertured as at 67, supported on and guided by a plurality of spaced, flanged rollers, such as indicated at 68, mounted on silo 10 through means of trunnion-bolts 28 and brackets such as indicated at 23. Flanges 69 and 71 are provided on the ends of said rollers 68, respectively, and the band type ring gear 66 is disposed on said rollers and between said flanges. Obviously should a flexible band or belt type ring gear be used, it can be adapted to elongated configurations, such a elliptical "ring gears," or the like, as well as circular ring gears. Uniformly spaced apertures 67 are adapted to receive sprocket teeth such as indicated on sprocket 38, Fig. 5.

Some of the characteristic features of this invention are an apertured type ring gear; an apertured channel section ring gear whereby rollers, embraced between the flanges of said ring gear, support and guide the ring gear in a fixed plane; an apertured, angle section ring gear whereby double-cone rollers, embraced between the legs of said ring gear, support and guide the ring gear in a fixed plane; an apertured angle section ring gear whereby simple rollers support and guide said ring gear in a plane; an apertured band or rim type ring gear, flexible or stiff, associated with a flanged roller, support and guide such ring gear in a fixed plane; a distributing fork adapted to handle difficult grass type ensilage; and a feed trough and associated ring gear eccentrically related with a silo.

Obviously many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. A feed dispensing silo, comprising: a silo having a discharge opening; a circular feed trough surrounding said silo, for receiving material from said discharge opening; a revolvable ring gear surrounding said silo, in proximity of and along said feed trough, said ring gear having flange and web members said web member having a plurality of spaced apertures adapted to engage with driving means; means engaging said flange member for supporting said revolvable ring gear; means mounted on said ring gear for distributing material in said trough; and driving means engageable in said ring gear apertures for revolving said ring gear.

2. A feed dispensing silo, comprising: a silo having a discharge opening; a circular feed trough surrounding said silo, for receiving material from said discharge opening; a revolvable ring gear disposed coaxially with said feed trough, said ring gear having a flange member directed inwardly and a substantially vertical web member having a plurality of spaced apertures adapted to mesh with driving teeth; means engaging said flange member for supporting said revolvable ring gear; means mounted on said ring gear for distributing material in said trough; and toothed driving means in mesh with said ring gear apertures for revolving said ring gear.

3. A feed dispensing silo, comprising: a silo having a discharge opening; a circular feed trough surrounding said silo, for receiving material from said discharge opening; a revolvable ring gear surrounding said silo and disposed coaxially with said feed trough, said ring gear comprising a channel section member having its flanges directed toward said silo and its web having a plurality of spaced apertures adapted to mesh with driving teeth; mounted rollers extending between said flanges for supporting said revolvable ring gear; means mounted on said ring gear for distributing material in said trough; and toothed driving means engageable in said ring gear apertures for revolving said ring gear.

4. A feed dispensing silo, comprising: a silo having a discharge opening; a circular feed trough surrounding said silo, for receiving material from said discharge opening; a revolvable ring gear surrounding said silo and disposed coaxially with said feed trough, said ring gear comprising a channel section member having its flanges directed toward said silo and its web having a plurality of spaced apertures adapted to mesh with driving teeth; a plurality of circumferentially spaced rollers mounted axially vertically on said silo, said rollers extending between said flanges and engaging the web and guiding said revolvable ring gear; means mounted on said ring gear for distributing material in said trough; and toothed driving means engageable in said ring gear apertures for revolving said ring gear.

5. A feed dispensing silo, comprising: a silo having a discharge opening; a circular feed trough surrounding said silo, for receiving material from said discharge opening; a revolvable ring gear surrounding said silo and disposed coaxially with and above said feed trough, said ring gear comprising a channel section member having its flanges directed toward said silo and its web having a plurality of spaced apertures adapted to mesh with sprocket teeth; a plurality of spaced rollers mounted on said silo, the axes of said rollers being disposed vertically, said rollers extending between said flanges and engageable therewith, and engageable with said web, for supporting and guiding said revolvable ring gear; fork means mounted on said ring gear and extending into said feed trough; and driving means mounted on said silo, including a sprocket in mesh with the apertures in said ring gear, for revolving said ring gear.

6. The apparatus of claim 5 wherein the fork means extends into the feed trough, and the sprocket is disposed interiorly of the ring gear.

References Cited in the file of this patent

UNITED STATES PATENTS

| | | |
|---|---|---|
| 1,004,228 | Alfson | Sept. 28, 1911 |
| 1,127,152 | Allen | Feb. 2, 1915 |
| 2,709,987 | Bubenzer | June 7, 1955 |
| 2,747,546 | Winter | May 29, 1956 |